Patented Nov. 27, 1923.

1,475,804

UNITED STATES PATENT OFFICE.

ROBERT DU BOIS AND HILTON IRA JONES, OF STILLWATER, OKLAHOMA.

METHOD OF PRESERVING EGGS.

No Drawing.      Application filed August 2, 1921. Serial No. 489,268.

*To all whom it may concern:*

Be it known that we, ROBERT DU BOIS and HILTON IRA JONES, both citizens of the United States, and residents of Stillwater, in the county of Payne and State of Oklahoma, have invented a new and Improved Method of Preserving Eggs, of which the following is a full, clear, and exact description.

The present invention relates to new and useful improvements in preserving eggs, and it pertains more particularly to a method of preserving eggs.

It is one of the primary objects of the invention to provide a method of preserving eggs, which is applicable to eggs either fertile or sterile.

It is a further object of the invention to provide a process which in no way affects the edibility of the product after it has been treated.

It is a further object of the invention to provide a method, the use of which does not require special conditions for storing the eggs after they have once been treated.

It is well known that the spoiling of eggs is caused by bacterial contamination from without, the decomposition of the substance of the egg resulting from the bacterial growth, and in the case of fertile eggs, the growth of the germ and its development within the shell. It necessarily follows that to properly preserve eggs, the two problems of sterilization and defertilization must be met.

In carrying out the process we employ a solution of dilute sulphuric acid, which solution consists of approximately three parts of water and one part of either commercial or pure concentrated sulphuric acid, it having been found that this solution or a solution approximately the same, produces a high state of effervescence when the eggs are introduced therein. Tests have proven that a solution of the strength which produces the greatest amount of effervescence is most desirable.

The eggs are first immersed, without washing, in this solution of dilute sulphuric acid, and are allowed to remain therein until effervescence has ceased, which period of time approximates one minute. The sulphuric acid attacks the shell and interacts with the calcium carbonate of which the shell is composed and forms calcium sulphate and carbon dioxide. The calcium sulphate is insoluble or practically so, in water, and it impregnates the pores of the shell, forming a coating thereon, which coating prevents further contact and action between the acid and the shell. After this step has been completed, the eggs are rinsed in clear water in order that the acid thereon may be removed to prevent contamination of the compound with which they are treated in the next step of the process.

After the action above described has taken place and the eggs have been rinsed, the same are found to be completely coated with calcium sulphate. The eggs are next immersed in a solution of aluminum soap so as to be completely covered with a film. The period of time in which the eggs are left in the aluminum soap compound is immaterial so long as they are left in the solution long enough to obtain a film which completely covers the eggs.

The aluminum soap solution with which the eggs are covered is obtained in the following manner:

The essential ingredients of aluminum soap consists of the aluminum salts of the fatty acids found in ordinary washing soaps. It has been found that it can be prepared from any kind of soap, but preferably the best soap for the purpose to which the aluminum soap is put in the present process, is a soap prepared from a hydrogenated oil. To obtain this solution, an amount of soap is chipped and dissolved in hot water. After the soap has been dissolved, a saturated solution of burnt potash alum, or other aluminum salt is added to the soap solution until precipitation is complete. The aluminum salts of the fatty acids present in the solution are insoluble in water and are precipitated instantly. This precipitate floats on the surface as a light, spongy, gummy mass, which is removed by filtering, after which the mass is pressed dry. This pressed mass while still in the moist state is dissolved in a suitable volatile solvent, of which there are several, the best results by experiment being obtained by the use of gasoline, chloroform, or ether. The solution thus obtained may be of varying strengths, but usually it consists of one to two pounds of the mass to one gallon of the solvent.

The solvent acts merely as a carrier and by its evaporation leaves the dissolved aluminum soap as a thin continuous film upon the surface of the egg. In order that the eggs may dry quickly after treatment, the solvent must be volatile in nature.

This aluminum mass when prepared in the above-described manner is a tasteless, odorless, gummy solid, absolutely inert and without effect on the digestive system. When applied to the eggs as above outlined, it becomes a permanent and impermeable sealer.

Actual experiment has proven that it is not necessary to have absolutely fresh eggs to preserve by this process. It is advisable, however, to have eggs as fresh as possible. It has been found that in the wintertime at temperatures less than sixty degrees Fahrenheit, eggs a week or more old can be successfully preserved. However, where the temperature exceeds sixty degrees Fahrenheit, the results obtained from using eggs less than five days old have been more satisfactory.

Eggs preserved in accordance with the above process maintain that state in which they were at the time of treatment, but eggs which have started to spoil obviously will not be preserved, since after the decay has started the preserving process will not check the same.

We claim:

1. The method of preserving eggs which consists in subjecting said eggs to the action of a solution which reacts with the elements of the shell of the egg, and forms a calcium sulphate coating, rinsing said eggs, and subjecting said eggs to the action of a second coating medium.

2. The method of preserving eggs which consists in subjecting the eggs to a bath of dilute sulphuric acid to form a coating, rinsing the eggs, and subsequently subjecting them to a bath of aluminum soap solution to form a second coating about said eggs.

ROBERT DU BOIS.
HILTON IRA JONES.